Feb. 22, 1944.   O. S. A. MESCH   2,342,595
ELECTROWELDING APPARATUS
Filed Dec. 22, 1942   2 Sheets-Sheet 1
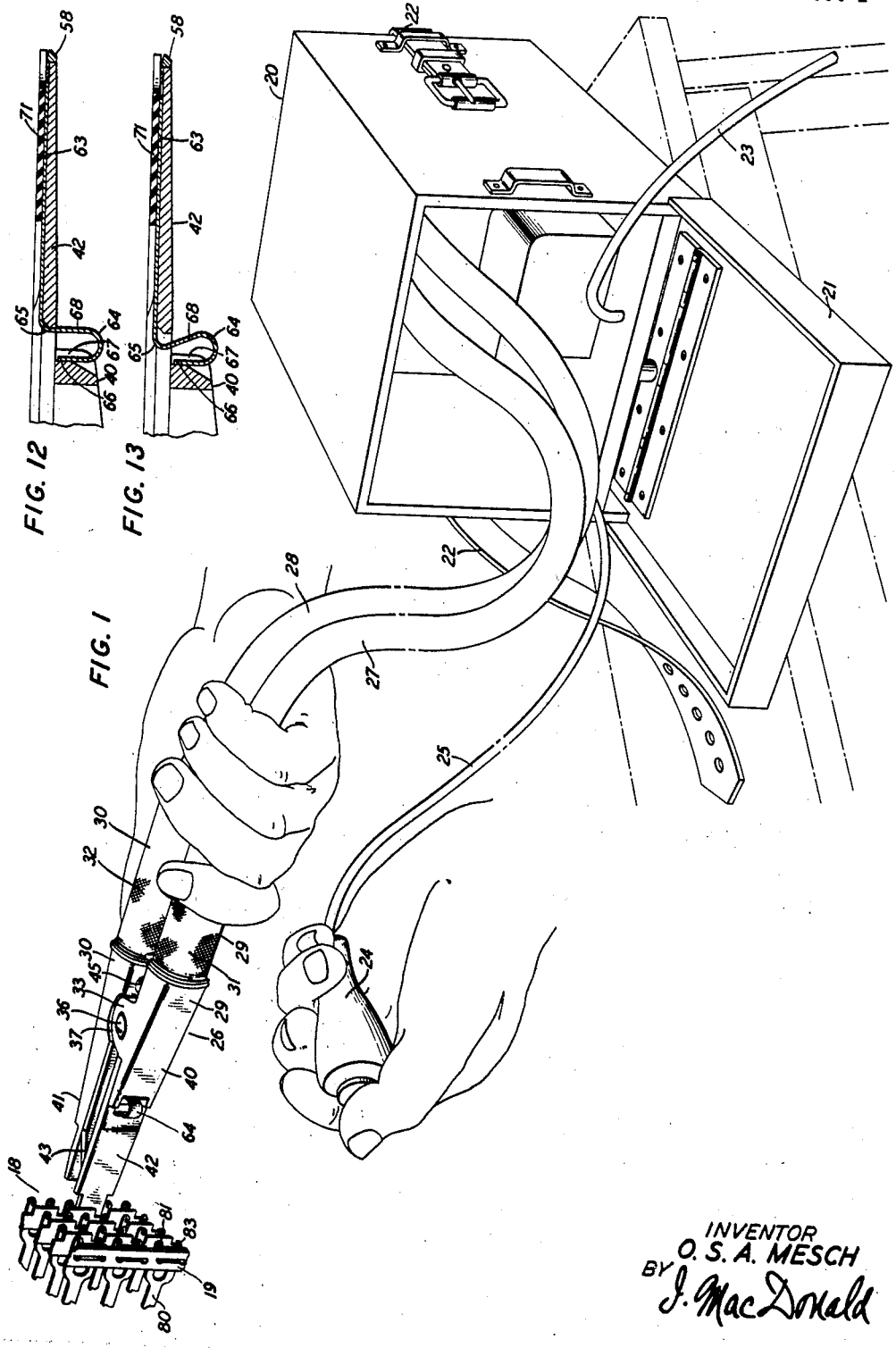
INVENTOR
O. S. A. MESCH
BY J. MacDonald
ATTORNEY Feb. 22, 1944.   O. S. A. MESCH   2,342,595
ELECTROWELDING APPARATUS
Filed Dec. 22, 1942   2 Sheets-Sheet 2
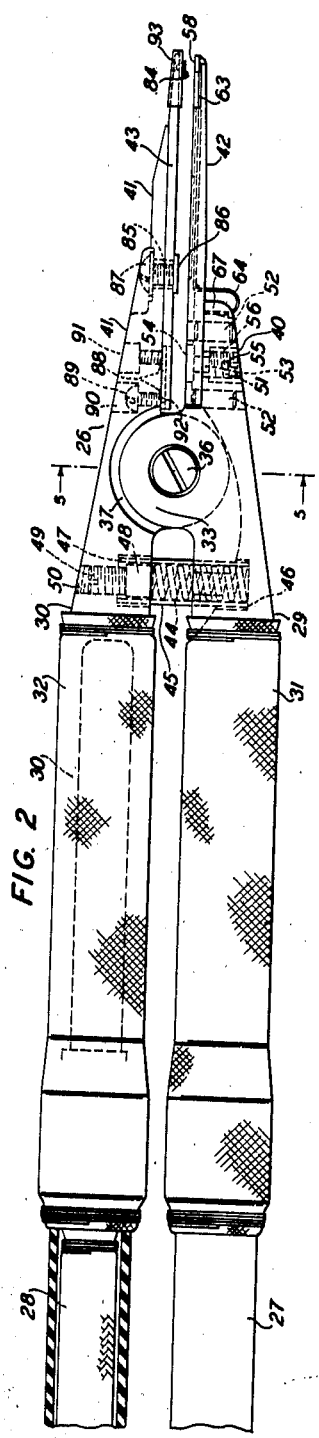
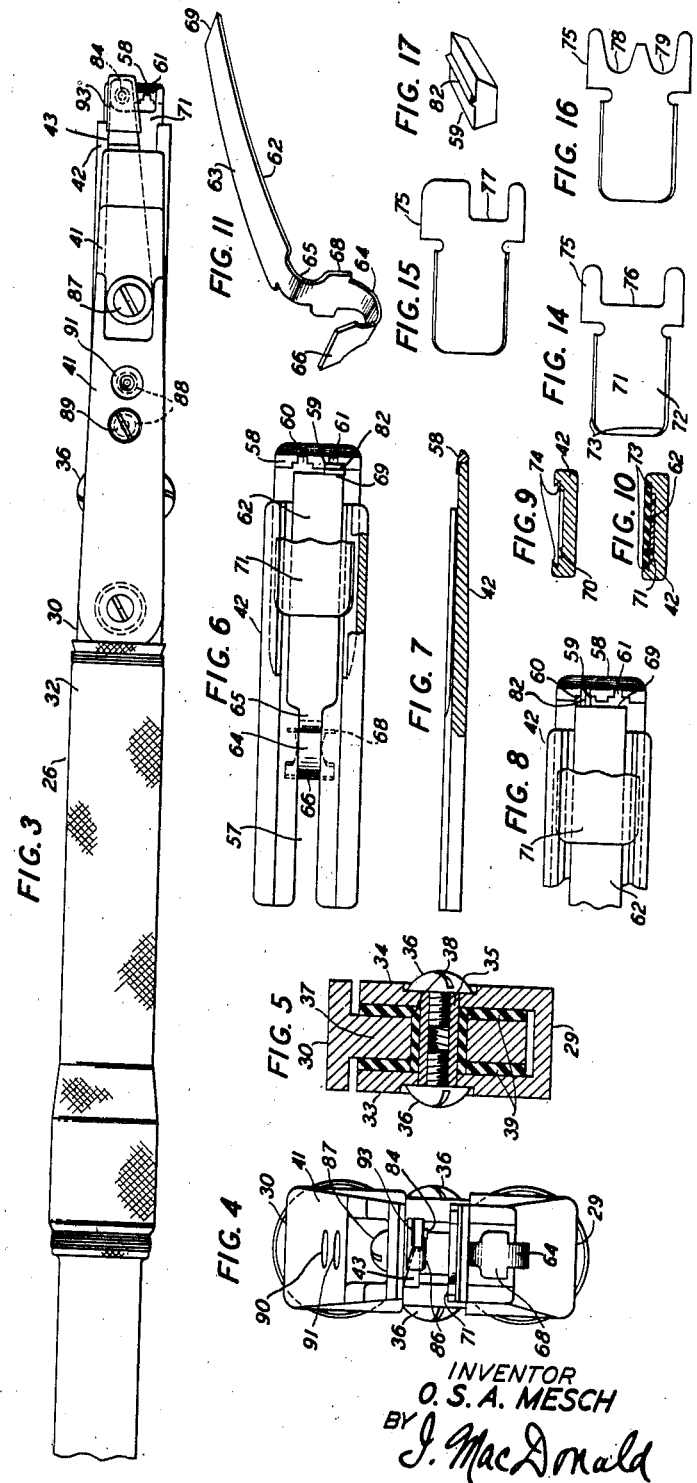
INVENTOR
O. S. A. MESCH
BY J. MacDonald
ATTORNEY Patented Feb. 22, 1944

2,342,595

UNITED STATES PATENT OFFICE 2,342,595

ELECTROWELDING APPARATUS

Orwar S. A. Mesch, St. Albans, N. Y., assignor to Bell Telephone Laboratories, Incorporated, New York, N. Y., a corporation of New York Application December 22, 1942, Serial No. 469,782

6 Claims. (Cl. 219—4)

This invention relates to electrowelding apparatus and more particularly to electrowelding apparatus involving a hand tool employed in holding parts together to be welded and applying welding current to the parts.

An object of the invention is to provide means for readily welding a small metal part to a support.

The apparatus provides means for quickly and accurately welding small pieces of contact metal to supports.

The invention is embodied in a pliers type hand tool in which means are provided for holding the piece of contact metal in required position for welding to a support.

A feature of the invention resides in the structures and arrangements of electrodes in the device.

Another feature resides in spring means supported on one of the electrodes of the pliers and operable to releasably hold a piece of contact metal in required position for welding.

Another feature resides in a plate carried by one of the electrodes and constructed and arranged to correctly position the pliers relative to the support.

In the drawings:

Fig. 1 shows the pliers type welding tool manually held in position relative to some closely spaced leaf spring type supports and in a required position for welding a piece of contact metal to one of the leaf spring type supports. A push-button type switch shown as being also manually held is provided to close a welding circuit. The switch and the welding pliers are electrically connected to welding current supply means housed in a carrying case which rests on a ladder or other means of support.

Fig. 2 is a side elevational view, partly in section, of the pliers type tool;

Fig. 3 is a top view of the tool shown in Fig. 2;

Fig. 4 is an end view of the tool shown in Fig. 2 and taken from the right of Fig. 2;

Fig. 5 is a view, in section, taken on the line 5—5 of Fig. 2;

Fig. 6 is a top view, partly in section, of the lower electrode of the tool shown in Fig. 2 and shows a piece of contact metal supported on the electrode and held thereon in required position.

Fig. 7 is an edge view, partly in section, of the electrode shown in Fig. 6;

Fig. 8 shows a fragmentary portion of Fig. 6 and with a piece of contact metal supported in a different position;

Fig. 9 is a cross-section of a portion of the lower electrode;

Fig. 10 corresponds to Fig. 9 and shows the spring and the plate supported on the electrode;

Fig. 11 is a view in perspective of the spring in original form;

Figs. 12 and 13 are views in longitudinal section of the lower electrode, the spring, the plate and the piece of contact metal supported on the electrode. Fig. 12 indicates the position of the spring when it is holding the piece of contact metal in place. Fig. 13 indicates the position of the spring when it is withdrawn from holding position;

Figs. 14, 15 and 16 show three different contoured plates; and

Fig. 17 is an enlarged view in perspective of the piece of contact metal.

It is common practice to have in electrical switching devices a pile-up of conducting supports and to have on the supports small pieces of contact metal through which the current may pass from one conducting support to another when the contacts are closed. The pieces of contact metal become worn and ineffective in service and require reconditioning or replacement from time to time. Considerable difficulty has been experienced in trying to replace a worn or ineffective contact with a new piece of contact metal due to the rather relatively close spacing of the conducting supports in the pile-up and the limited amount of space available for applying a tool in fastening the new piece of contact metal in place. Because of these difficulties it has been common practice to remove the entire switching device from its support, remove and separate the conducting supports in the pile-up and replace the conducting support having the worn contact piece with a new conducting support provided with an unworn piece of contact metal. This is quite expensive because considerable labor is involved in dismantling the parts and because it involves furnishing a whole new contact assembly.

My invention provides means for electrowelding a new piece of contact metal to a leaf spring type support without requiring removal of the switching device from its support and without requiring disassembling and reassembling the pile-up of leaf spring type supports. Contact parts of automatic telephone switches, multicontact switches and relays may be readily supplied with contact points by means of this invention. It is obvious, therefore, that the invention provides a means for considerably reducing the cost of reconditioning the contact parts of switching devices having leaf spring type conducting parts and contact points on the leaf spring type conducting parts.

The welding apparatus shown in Fig. 1 is made portable so that it may be brought to the vicinity of a group of conducting supports 18 which it will be understood may be pile-ups of leaf spring type supports supported on a frame 19. Certain parts of the welding apparatus are housed in a carrying case 20 equipped with a hinge-connected lid 21 and a carrying strap 22. A source of current supply, not shown, is electrically connected to certain parts contained in the carrying case 20 by means of an extension cord 23. A manually controlled push-button type switch 24, electrically connected to apparatus in the carrying case 20 by means of an extension cord 25, is provided to control the application of welding current to the electrodes in the pliers type welding tool 26. The pliers type welding tool 26 is supplied with welding current through the flexible insulated conductors 27 and 28 which extend from certain apparatus parts housed in the carrying case 20 and to the handles of the welding tool 26.

The pliers type welding tool 26 shown in Figs. 1, 2 and 3 operates in a squeeze-to-open manner and comprises handles 29 and 30 covered respectively with insulating sleeves 31 and 32. The handles 29 and 30 are pivotally connected and are electrically insulated from each other as shown in Fig. 5, one end of the handle 29 being channel-shaped and having spaced flange portions 33 and 34 which are apertured to receive an internally threaded cylindrical tube 35 extending through the flange portions 33 and 34 and across the space between the flange portions 33 and 34. Screws 36—36 are provided in the ends of the tube 35 to hold the tube 35 in required position. The handle 30 is provided with an apertured extension 37 arranged to extend in the space between the flange portions 33 and 34 of the handle 29. A bushing 38 of insulating material extends through the aperture in the extension 37 and into engagement with the inner surfaces of the flange portions 33 and 34 and is mounted on the tube 35 to insulatingly space the extension 37 from the tube 35. Insulating washers 39—39 mounted on the bushing 38 and located between the inner surfaces of the flange portions 33 and 34 and the extension 37 prevent engagement of the extension 37 with the flange portions 33 and 34. The handles 29 and 30 are tapered at one end and extend beyond their pivotal points of support to provide jaws 40 and 41, respectively, and on which electrodes 42 and 43 are supported, the electrode 42 being supported on jaw 40 and the electrode 43 being supported on jaw 41.

When the handles 29 and 30 are squeezed toward each other as shown in Fig. 1 the jaws 40 and 41 are opened to the position shown in Fig. 2, against the action of the helical spring 44 enclosed in an insulating tube 45 mounted in a recess 46 formed in the handle 29. The tube 45 extends into a recess 47 formed in the handle 30 and may be moved therein when the handles 29 and 30 are operated. The tube 45 and the recess 47 are so dimensioned that the electrodes 42 and 43 may be moved apart only a little more than is required to clear the electrodes and parts supported thereon from a leaf spring type support 18. The spring 44 bears at one end against the base of the recess 46 and is engaged at the other end by a plug 48 of insulating material which is adjustably positioned against the spring 44 by means of a set screw 49 supported in a screw-threaded aperture 50 in the handle 30. The spring 44 operates to urge the jaws 40 and 41 toward each other and provides the pressure required in welding parts engaged by the electrodes 42 and 43 as will be subsequently explained. The pressure may be regulated by adjusting the set screw 49 relative to the plug 48 engaging one end of the helical spring 44.

The electrode 42 is a rectangular bar of conducting material and, as shown in Fig. 2, is mounted at one end on the jaw 40 by means of a screw 51 and two spaced pins 52—52. The screw 51 has a reduced shank portion 53, a disc-like head portion 54 and a lower male-threaded portion 55 which is entered in a tapped bushing 56 supported in the jaw 40, the threaded end of the screw being provided with a kerf to permit rotation of the screw by means of a screw-driver. The electrode 42 as shown in Figs. 6, 9 and 10 is reduced in thickness down its central portion to accommodate the disc-like head 54 of the screw 51 and a spring and plate to be subsequently described. The rear end of the electrode 42 as shown at the left of Fig. 6 is provided with an elongated aperture 57 to receive the pins 52—52 and the reduced shank 53 of the screw 51. When the screw 51 is turned toward the right the disc-like head 54 is elevated to permit sliding the electrode 42 under the head 54. After the electrode 42 is placed in required position on the jaw 40 the screw 51 is turned toward the left to bring the disc-like head 54 down against the electrode 42 to hold the electrode 42 in position, the pins 52—52 preventing rotation of the electrode 42 on the screw 51. The forward end of the electrode 42 as shown in the right of Fig. 6 is reduced in width and thickness and a block 58 of high heat resisting material is provided thereon. The block 58 is welded or otherwise fastened to the end of the electrode 42 and is slightly thicker than the end portion of the electrode 42. The inner edge of the block 58 serves as a stop for a small piece of contact metal placed on the electrode 42 and which is to be welded to a support such, for instance, as the leaf spring type support of a switch or relay. The inner edge of the block 58 is contoured to provide two receptacles for pieces of contact metal 59 which may be of the form shown in Fig. 17 and which is shown in Fig. 17 in much larger form than in other figures in the drawings. The receptacles formed in the block 58 are identified in the drawings as 60 and 61 and are in form like one arm and a portion of the widened base of a quadrate cross.

A spring 62 of the form shown in Fig. 11 is supported on the electrode 42 as shown in Figs. 6 and 8 so that one end of the spring 62 will be thrust against an edge of the piece of contact metal 59 when the piece of contact metal 59 is located in the receptacle 60 or 61. The spring 62 in original form and as shown in Fig. 11 has a long rectangular finger portion 63 which is slightly bowed to insure that the end portion 69 will always be resting against the electrode 42. One end of the spring 62 is formed to provide a U-shaped spring portion 64 having one end terminating in a curved neck 65 which is narrower than the finger portion 63 and extends downwardly from the finger portion 63. The other end of the spring portion 64 is widened to provide a bearing plate portion 66 to fit a notch 67 formed in end of the jaw 40. The juncture of the spring portion 64 with the neck 65 is made as wide as the finger portion 63 to prevent the spring portion 64 from moving upwardly through the aperture 57 in the electrode 42 and also to provide a finger grip 68 to be engaged by the finger of an operator of the welding tool in withdrawing the end portion 69 of the spring 62 from engagement with the block 58.

In mounting the spring 62 on the electrode 42 the finger portion 63 is placed in a channel 70 shown in Fig. 9, the neck 65 being extended through the aperture 57 as shown in Fig. 6 and so that the finger grip 68 and the bearing plate portion 66 are on an opposite face of the electrode 42 from that engaged by the finger portion 63. A plate 71 of insulating material is placed over the finger portion 63 of the spring 62 to hold the finger portion 63 in the channel 70, the plate 71 having a flat portion 72 wider than the spring 62 and having beveled edge portions 73 fitting into tracks 74 formed in the electrode 42. The plate 71 is removably supported on the electrode 42 and serves to prevent too far thrusting of the electrodes 42 and 43 along a leaf spring type support of a switch or relay. The finger portion 63 of the spring 62 is somewhat flattened against the electrode 42 by means of the plate 71 and is in frictional engagement with the plate 71 and holds the plate 71 against outward movement along the tracks 74. The plate 71 is contoured on its outer end 75 to accommodate an outer end of the leaf spring type support and may be made of various forms shown in Figs. 14, 15 and 16, the particular contour of the outer end 75 being determined by the shape and size of the end of the leaf spring type support and the point at which it is desired to weld a piece of contact metal to the leaf spring type support. Since the plate 71 is made of insulating material and is located on the inner face of the electrode 42, it serves to prevent the electrodes 42 and 43 from coming into electrical contact with each other when the handles of the welding device are manually released. In Fig. 14 the outer end portion 75 of the plate 71 is contoured at 76 to accommodate a relatively wide leaf spring type support. Fig. 15 shows the outer end 75 of the plate 71 contoured at 77 to accommodate a narrower leaf spring type support and which may be slightly off center from the position of a leaf spring type support to be accommodated by the plate shown in Fig. 14. The plate shown in Fig. 16 is contoured on its outer end 75 to provide two spaces 78 and 79 to receive leaf spring type supports of narrower and different form from the leaf spring type supports accommodated by the plates shown in Figs. 14 and 15.

When it is desired to weld a piece of contact metal 59 shown in Fig. 17 to a leaf spring type support in the manner shown in Fig. 1, the particular form and location of the leaf spring type support is noted and a plate 71 contoured to accommodate an outer end of that leaf spring type support is inserted in the electrode 42 over the spring 62, the handles of the welding tool 26 being manually squeezed toward each other. The spring 62 is then manually operated to withdraw the end portion 69 from engagement with the block 58 to provide an open space on the electrode 42 to receive the piece of contact metal 59. This may be done by the operator of the device pressing a finger against the finger grip 68 and pressing the finger grip 68 toward the bearing plate portion 66 to build up spring pressure in the curved portion 64. The extent of withdrawal of the end portion 69 of the spring 62 from the block 58 will depend on the manual pressure applied to the finger grip 68 and should be such that the piece of contact metal 59 may be placed in required position on the electrode 42. When the piece of contact metal 59 should extend longitudinally of the length of the leaf spring type support 80 and be located in the position shown at 81 in Fig. 1, the piece of contact metal 59 is placed in the position shown in Fig. 8 and with the rib 82 of the piece of contact metal 59 shown in Fig. 17 located on the upper face of the piece of contact metal 59. In this case one end of the piece of contact metal 59 is in the deep end of the receptacle 60. The other end of the piece of contact metal 59 is engaged by the end portion 69 of the spring 62 which upon release of the manual pressure applied to the finger grip 68 will thrust against the piece of contact metal 59 to clamp the piece of contact metal 59 in position while it is being welded to the leaf spring type support. The end portion 69 is bevelled as shown in Fig. 11 to provide a knife edge to engage the piece of contact metal 59. When the piece of contact metal 59 should be positioned transversely of the run of the leaf spring type support, the piece of contact metal 59 should be set in the receptacle 60 or 61 so that it extends lengthwise of the widened base of the receptacle. This position is illustrated in Fig. 6. In this case the piece of contact metal 59 is in the receptacle 61 and in position to be welded in place of the contact 83 which is located in a lower corner portion of the leaf spring type support. In the event that it is required to weld a piece of contact metal 59 to an upper corner portion of a leaf spring type support, the piece of contact metal 59 will be placed in the receptacle 60 on the electrode 42 as shown in Fig. 8. It will be understood that when the piece of contact metal 59 should extend transversely of the length of the leaf spring type support, the piece of contact metal 59 would be placed in the receptacle 60 but rotated 90 degrees from the position shown in this figure.

The electrode 43 carries a button-like piece 84 of high melting point metal to engage a face of the leaf spring type support opposite from the face engaged by the piece of contact metal 59 and is pivotally supported on an internally threaded bushing 85 which extends through an aperture in the electrode 43 and into an aperture in the jaw 41. The lower end of the bushing 85 is provided with a flange 86 to frictionally engage the lower surface of the electrode 43. A screw 87 rotatably supported in the jaw 41 and extending into screw threaded engagement with the bushing 85 is provided to pull the flange 86 into engagement with the electrode 43. The electrode 43 may be rotated on its pivotal point of support to bring the button-like piece 84 into registry with the piece of contact metal 59. The upper surface of the inner end of the electrode 43 is recessed at spaced points 88—88 to selectively receive the ball pointed end of a screw 89. The screw 89 may be located in either of two tapped holes 90 and 91 provided in the jaw 41 rearwardly of the pivotal point of support of the electrode 43, the hole 90 being located rearwardly of the hole 91. The base of each hole 90 and 91 is apertured in reduced diameter so that the ball pointed end portion 92 of the screw 89 may extend through to the recesses 88 in the electrode 43. The screw 89 and the recesses 88—88 serve as detent means to hold the electrode 43 in a required rotated position, the inner end of the electrode 43 being flexible enough to permit forcible rotation of the electrode 43 but having sufficient spring tension to normally hold the recess 88 against the end portion 92 of the screw 89. When the screw 89 is located in the tapped hole 91 and so that the end portion 92 is in the path of movement of the forward recess 88 in the electrode 43, the movement permitted is greater than when the screw 89 is located in the hole 90. The range of pivotal movement of the electrode 43 may therefore be controlled by the detent means so that the button-like contact 84 will be in a desired position.

In welding a piece of contact metal 59 to a leaf spring type support 18 and with the piece of contact metal 59 supported in the pliers type welding tool 26 in the proper position and with the electrode 43 adjusted so that the button-like contact 84 is in registry with the piece of contact metal 59, the handles of the tool are squeezed to open the jaws so that the tool may be manually thrust relative to the leaf spring type support 18 to bring the piece of contact metal 59 on one side of the leaf spring type support and the button-like contact 84 on the opposite side of the leaf spring type support. The manual pressure on the handles of the tool is then slightly lessened to allow the rib 82 on the piece of contact metal 59 to engage one face of the leaf spring type support 18 while the opposite face is engaged by the button-like contact 84. The welding tool 26 is then manually thrust along the leaf spring type support 18 until the end of the leaf spring type support 18 comes into engagement with the contoured portion 76 of the plate 71 which stops further trusting of the welding tool 26 along the leaf spring type support and insures proper positioning of the tool for the welding operation. The manual pressure on the handles of the tool 26 is then released to allow the spring 44 to apply the pressure required during the welding operation. The switch 24 is then manually operated to switch on the welding current which is supplied to the piece of contact metal 59 and the leaf spring type support 18 through the conductors 27 and 28, handles 29 and 30, jaws 40 and 41, the electrodes 42 and 43 and the button-like contact 84. It will be understood that the rib 82 on the piece of contact metal 59 is melted during the welding operation and the upper surface of the piece of contact metal 59 shown in Fig. 17 is welded to the leaf spring type support, the spring 44 supplying the required pressure to force the piece of contact metal 59 itno close engagement with the leaf spring type support 18. Upon completion of the welding operation the handles of the welding tool 26 are manually squeezed to move the electrode 42 so that the block 58 comes out of engagement with the piece of contact metal 59. The tool 26 may then be withdrawn from the leaf spring type support 18.

The insulating tube 45 and the depth of the recess 47 as above pointed out are so dimensioned as to length that the movement of the electrodes 42 and 43 away from each other is very slight. The object of limiting the extent of separation of the electrodes 42 and 43 when the handles are squeezed is to prevent the electrodes 42 and 43 from opening so far that leaf spring type supports positioned rather closely to the one being supplied with a piece of contact metal 59 might be bent out of desired position. The limited opening of the electrodes also prevents grasping two or more of the leaf spring type supports in a pile-up at one time. It will be appreciated that over flexing of the leaf spring type support is very undesirable, the spacing of contacts in a pile-up of leaf spring type supports in a switch or relay is often quite critical and it is therefore quite important that the critical setting of the leaf spring type support should not be disturbed or changed. A cap 93 of insulating material is mounted on the outer end of the electrode 43 to prevent the electrode 43 from coming into electrical contact with the leaf spring type support. The cap 93 is apertured to allow the button-like contact 84 to engage the leaf spring type support.

The pliers type welding apparatus above described is so constructed and arranged that it may be used in quickly welding a piece of contact metal to a leaf spring type support in a pile-up of rather closely spaced leaf spring type supports and without disturbing or changing the space setting of any of the leaf spring type supports. The apparatus may be readily transported and used as a means for welding pieces of contact metal to leaf spring type supports in closely spaced pile-ups of the leaf spring type supports without requiring disassembling the pile-ups and without disturbing the critical space setting of the leaf spring type supports. The apparatus therefore works a considerable saving in the expense of applying contact pieces to leaf spring type supports and particularly in reconditioning contact parts of switches already in service.

What is claimed is:

1. A welding tool suitable for welding a piece of contact metal to a leaf spring comprising a pair of jaws movable relative to each other, an electrode pivotally supported on one of said jaws, an electrode supported on the other of said jaws, said electrodes being arranged to receive the leaf spring between them and means on the second-mentioned electrode for releasably supporting the piece of contact metal in such position that it will engage a desired portion of the leaf spring when said jaws are operated to move said electrodes to a closed position.

2. A welding tool suitable for welding a piece of contact metal to a leaf spring comprising a pair of jaws pivotally connected together and electrically insulated from each other, an electrode pivotally supported on one of said jaws, an electrode fixedly supported on the other of said jaws, said electrodes being constructed and arranged to receive said leaf spring between them, a receptacle formed in the second-mentioned electrode and arranged to receive said piece of contact metal and a spring finger slidably supported on the second-mentioned electrode and operable to releasably hold said piece of contact metal in said receptacle.

3. A welding tool suitable for welding a piece of contact metal to a leaf spring comprising a pair of pivotally connected jaws insulated from each other, an electrode pivotally supported on one of said jaws and arranged to swing laterally of that jaw, an electrode supported on the other of said jaws, said electrodes being constructed and arranged to receive said leaf spring between them, a groove formed longitudinally in the second-mentioned electrode, a block formed across the outer end of said groove and contoured to provide a receptacle for said piece of contact metal, a spring, a finger portion on said spring slidably supported in said groove and movable to releasably hold said piece of contact metal in said receptacle, a U-shaped spring portion continuing from said finger portion and extending outwardly of the second-mentioned electrode and bearing against the jaw supporting that electrode, said U-shaped spring portion being manually operable in one direction to pull said finger portion out of contact with said piece of contact metal and said U-shaped spring portion having sufficient spring tension therein to normally hold said finger portion in engagement with said piece of contact metal.

4. A welding tool suitable for welding a piece of contact metal to a leaf spring comprising a pair of pivotally connected jaws insulated from each other, an electrode supported on one of said jaws, a longitudinally channeled and apertured electrode supported on the other of said jaws, said electrodes being arranged to receive said leaf spring between them, spring means extending between said jaws and operative to urge said electrodes toward each other, a block formed on one end of said channeled electrode and contoured to provide a receptacle for the piece of contact metal, a spring supported on said channeled electrode, a finger portion on said spring lying in the channel portion of said channeled electrode and extending toward said block, a neck portion on said spring extending from said finger portion and through the aperture in said electrode, a U-shaped portion on said spring extending at an angle and outwardly of said channeled electrode and having bearing engagement with an end portion of the jaw supporting said channeled electrode, said U-shaped portion being manually operable to draw said finger portion away from said block and having sufficient spring tension to move said finger portion to normal position on manual release of said U-shaped portion.

5. A welding tool suitable for welding a piece of contact metal to a leaf spring comprising a pair of pivotally connected jaws insulated from each other, electrodes supported on said jaws, said electrodes being arranged to receive said leaf spring between them, a channel formed in one of said electrodes, a block supported across one end of said channel, said block being recessed to provide a receptacle for said piece of contact metal, a finger supported in said channel and extending close enough to said block to frictionally hold said piece of contact metal in the receptacle, a plate supported in said channel and holding said finger against dislodgement from said channel, said plate being contoured on its outer end to accommodate an end of said leaf spring, and operating to prevent too far thrusting of said tool along said leaf spring, a U-shaped spring portion on said finger extending outwardly of the channeled electrode and bearing against the jaw supporting that electrode and said U-shaped spring portion having sufficient spring tension to normally maintain said finger against said piece of contact metal and being manually compressible to release said finger from engagement with the piece of contact metal.

6. A welding tool suitable for welding a piece of contact metal to a leaf spring comprising a pair of pivotally connected jaws insulated from each other at their pivotal point of connection, an electrode pivotally supported on one of said jaws, said electrode having spaced recesses formed therein to selectively receive a screw selectively mounted in the jaw supporting said electrode, said screw and the recesses formed in said electrode providing detent means to hold said electrode in a required adjusted position, an apertured cap of insulating material supported on said electrode, a button-like contact supported on said electrode and extending through the aperture formed in said cap, a second electrode supported on the other of said jaws, said electrodes being arranged to receive the leaf spring between them, a block supported on said second electrode, said block being formed to provide a receptacle for said piece of contact metal, spring means supported on said second electrode and operable to releasably hold said piece of contact metal in the receptacle provided by said block, said spring means being manually operable to release said piece of contact metal from said block, means to operate said jaws to urge said electrodes toward said leaf spring and clamp said leaf spring between said button-like contact and said piece of contact metal and means to supply welding current to said electrodes to weld said piece of contact metal to said leaf spring.

ORWAR S. A. MESCH.